INVENTORS
RONALD F. OBERGEFELL
ROBERT A. SHIVAK

BY McNenny, Farrington,
Pearne & Gordon
ATTORNEYS

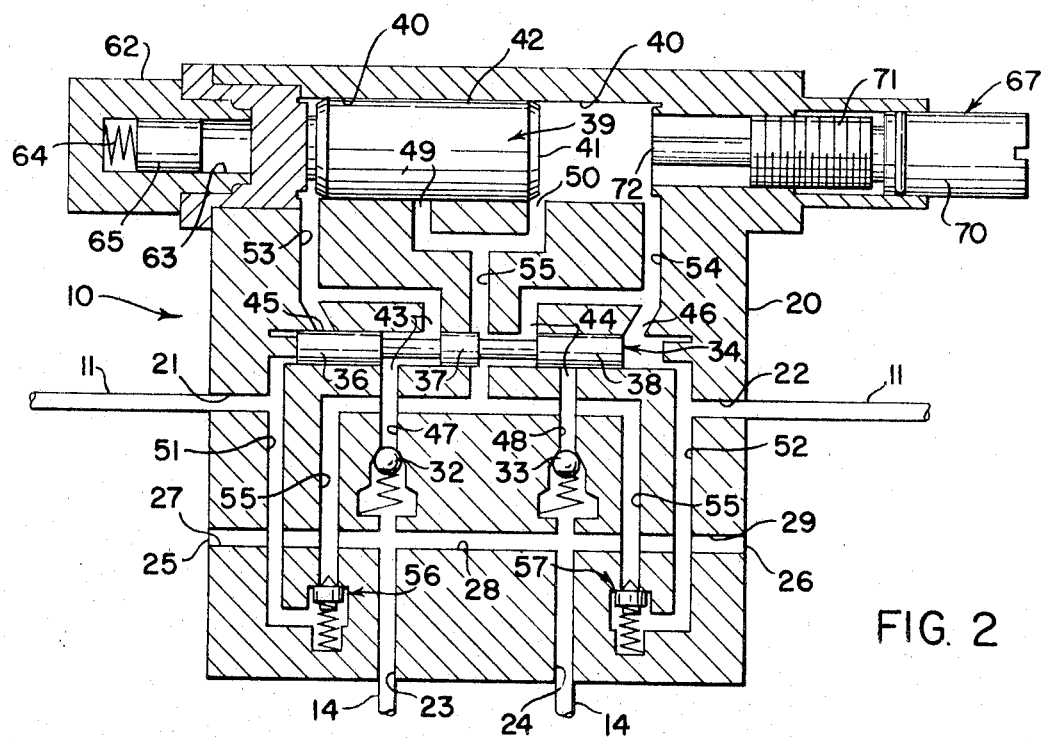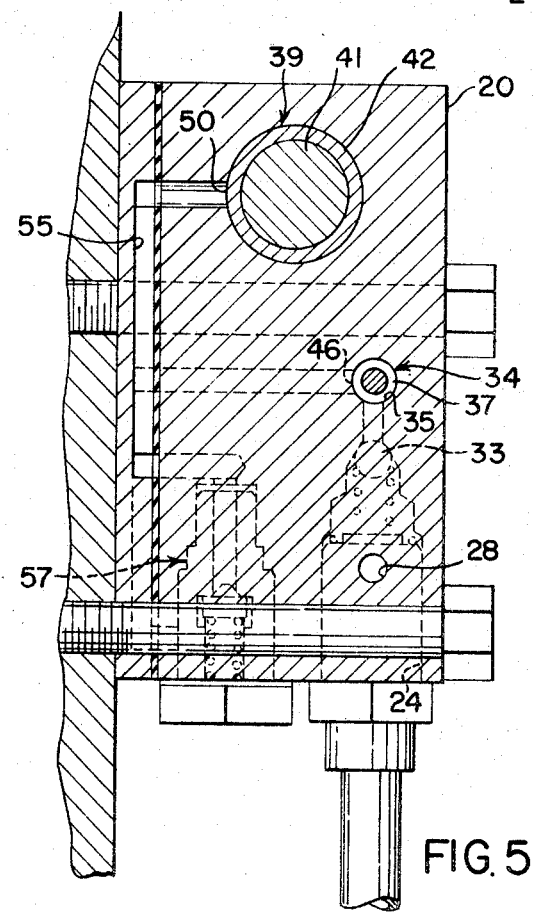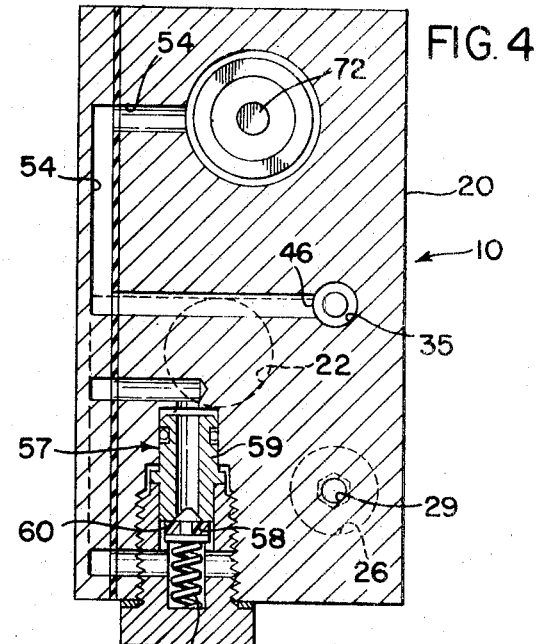

INVENTORS
RONALD F. OBERGEFELL
ROBERT A. SHIVAK
BY McNenny, Farrington,
Pearne & Gordon
ATTORNEYS United States Patent Office 3,515,245
Patented June 2, 1970

3,515,245
LUBRICANT REVERSER METERING VALVE SYSTEM
Ronald F. Obergefell and Robert A. Shivak, Cleveland, Ohio, assignors to Houdaille Industries, Inc., Buffalo, N.Y., a corporation of Delaware
Filed Nov. 30, 1967, Ser. No. 687,057
Int. Cl. F16n 25/02
U.S. Cl. 184—7    4 Claims

ABSTRACT OF THE DISCLOSURE

A single line reversing feeder which includes a valving arrangement for delivering a metered amount of a lubricant directly to bearings or to intermediate lubricant distributors and, thereafter, passing lubricant through the feeder to other like feeders in the single line. The feeder includes a positive cycling feature which prevents flow along the line to the next downstream feeder prior to the discharge of its metered amount of lubricant. The feeder may include a cycle indicator.

BACKGROUND OF THE INVENTION

Single line reversing feeders are intended to be connected to a single supply line which forms a loop and are intended to feed cycling or cyclic distributors or points of lubrication in a progressive manner according to flow through the single line. As each reversing feeder meters a measured amount of lubricant through a distribution line and, ultimately, to a point of lubrication, the single line is blocked and after each feeder performs its metering function, flow is permitted through that feeder to the next downstream feeder. When all feeders in the line have performed their functions and the lubricant flow completes a single circuit through the line, the lubricant flow is reversed in the loop.

Prior art single line reversing feeders include flow control valves which are intended to be reversed in response to reversal of flow through the feeder to block through flow until that feeder has discharged a measured amount of lubricant. Prior to such reversal, however, fluid may flow through the feeder and to the next feeder in the line. Such prior art devices rely upon incoming fluid pressure to close such valves. However, these valves may become clogged and not close properly.

Many prior art feeders are provided with a cycle indicator which comprises a pin extending through a sidewall of the feeder and into the metering chamber. The pin is normally biased inwardly so that at the completion of each stroke of the metering piston, the pin is pushed outwardly to indicate proper cycling. The provision of a pin extending through the sidewall of such feeders necessitates close tolerances between the sidewall and the pin and requires packings to minimize fluid loss between the sidewall and the pin. Also, the necessary displacement of the pin within the measuring chamber may adversely affect accuracy of metering.

SUMMARY OF THE INVENTION

A single line reversing feeder according to this invention overcomes many prior art problems by providing a feeder having valves which are closed by the cessation of one-way flow past the valve and do not depend upon reverse flow for their closure. A reversing feeder according to this invention may include a cycle indicator which eliminates the necessity for rod passageways through the feeder and into a metering chamber. According to this aspect of the invention, one end of the metering piston is provided with a magnet and an indicator magnet is located outside of the feeder housing opposite the piston-mounted magnet. Each magnet is positioned so that a pole opposes the corresponding pole on the other magnet so that, when the metering piston reaches one limiting end position, the external magnet will be repelled against the bias of a spring.

Other objects, advantages, and features of the invention will become more readily apparent and understood from the following detailed description of the invention and from the accompanying drawings:

BRIEF DESCRIPTION OF THE DRAWINGS

FIG. 2 is a schematic, sectional view of a reversing feeder embodying the invention;

FIG. 4 is a cross sectional view, the plane of the section being indicated by the line 4—4 in FIG. 3; and FIG. 5 is a cross sectional view, the plane of the section being indicated by the line 5—5 in FIG. 3.

DESCRIPTION OF THE PREFERRED EMBODIMENT

Figure 1:
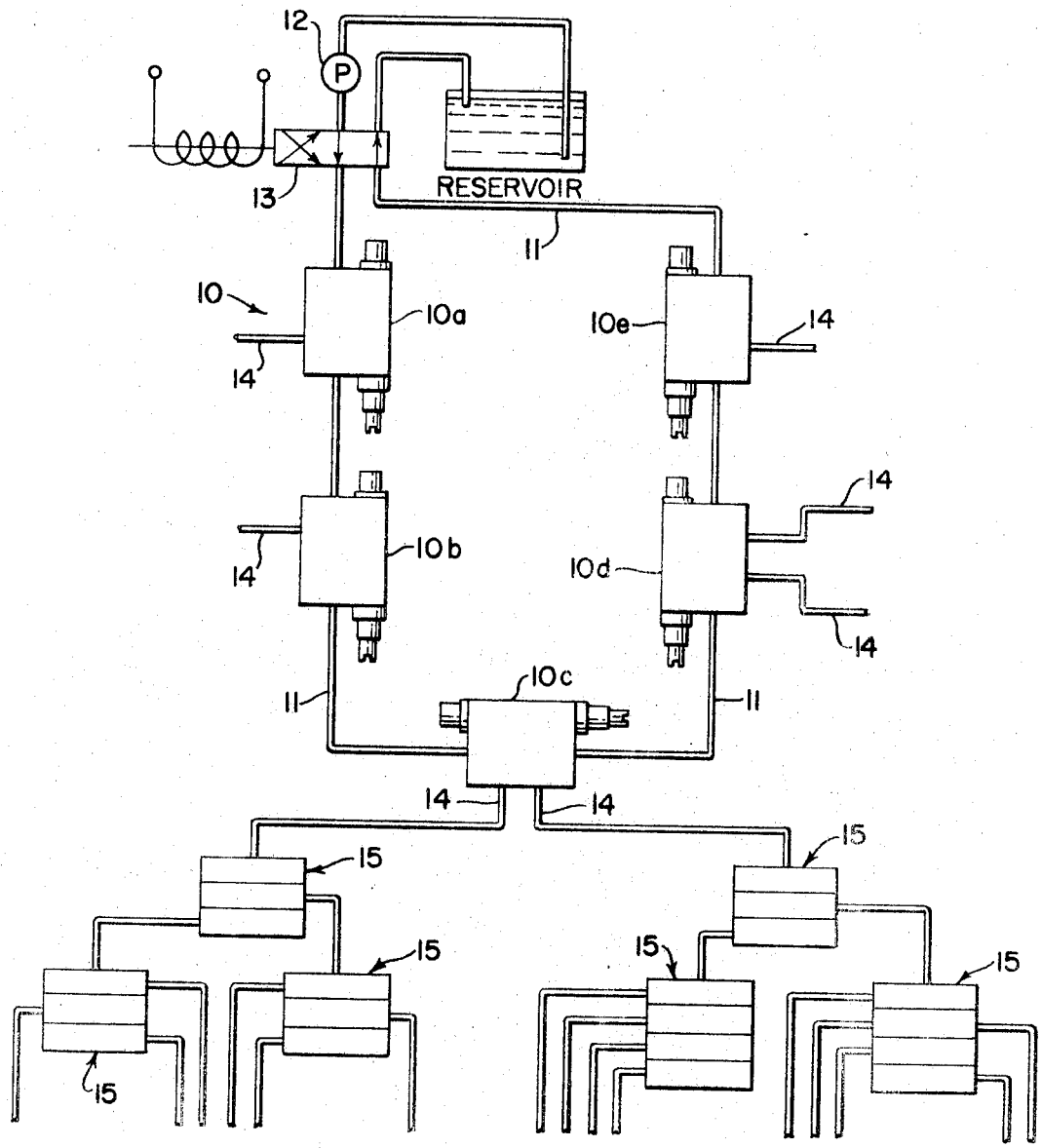
FIG. 1 is a diagrammatic view of a lubricating system embodying the invention.

Referring now to the drawings, a single line reversing feeder 10 is illustrated. As may be seen in FIG. 1, the feeders 10 are connected to a single line or loop 11 which is connected to a pump 12 through a four-way reversing valve 13. The valve 13 changes flow direction around the loop 11 so that such flow is changed alternately between clockwise and counterclockwise directions.

Assuming that the valve 13 causes lubricant flow in the counterclockwise direction in FIG. 1, lubricant enters a first feeder 10a. In a manner which will hereinafter become apparent, the feeder 10a first meters a measured amount of lubricant to a system delivery line 14 and, after performing this metering function, permits lubricant flow through the line 11 to a second feeder 10b. After the feeder 10b performs its metering function to deliver a measured amount of lubricant to its system delivery line 14, the lubrication cycle progresses through remaining feeders 10c, 10d, and 10e. After flow of lubricant through the entire loop in this manner, a lubricant sensing means (not shown) senses the completion of the counterclockwise lubricating cycle and reverses the valve 13 so that lubricant flows through the system in a clockwise direction.

Each feeder 10a–10e is located in a lubricating zone wherein a plurality of bearings are to be provided with periodic measured amounts of lubricant. Thus, at each zone, system delivery lines 14 may lead to cyclic lubricating devices such as the devices 15 shown schematically in FIG. 1.

Figure 3:
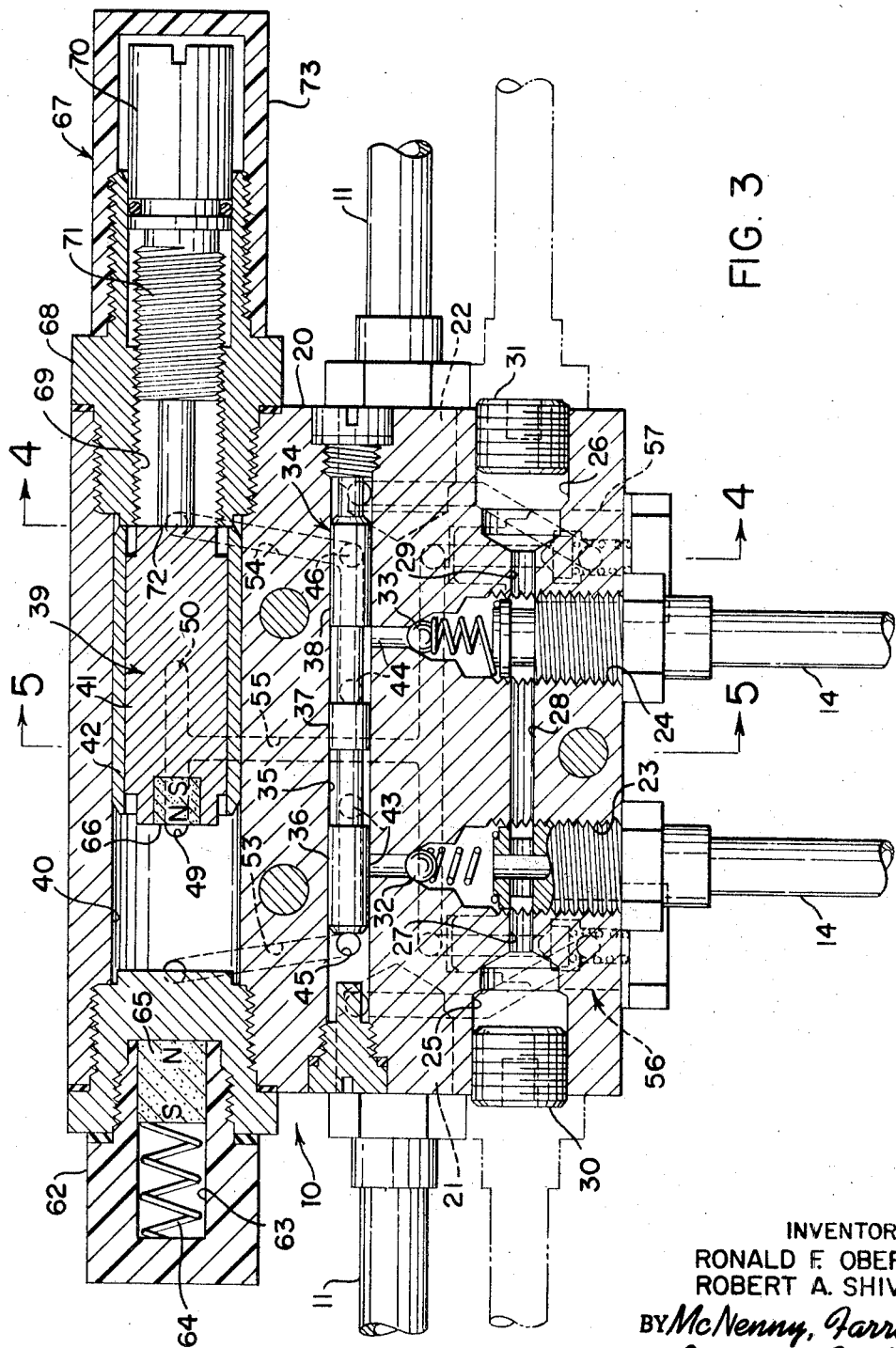
FIG. 3 is a sectional elevation of a detailed structural embodiment of the feeder shown in FIG. 2.

As is shown schematically in FIG. 2 and in more detail in FIGS. 3 through 5, a reversing feeder comprises a block or body 20 having first and second in-out line ports 21 and 22 provided therein. The in-out line ports 21 and 22 are intended to be connected to the line 11. The block 20 is also provided with system delivery ports 23, 24, 25, and 26. The ports 23–26 are interconnected by passages 27, 28, and 29 so that at least one port 23–26 may be blocked while the remaining port or ports are connected to a system delivery line 14. As is shown in FIG. 3, the ports 25 and 26 are blocked by cap screws 30 and 31 respectively. With both ports 23 and 24 open and with ports 25 and 26 blocked as illustrated, the passage 28 between those ports would be blocked by a suitable plug (not shown). The passage 28 would be open if only one of the ports 23–26 is open. The ports 23 and 24 may be provided with outlet check valves 32 and 33 respectively.

A first valve and plunger unit 34 is slidable within a valving piston chamber 35 and includes a piston having lobes 36, 37, and 38.

A second valve and plunger unit 39 is slidable within a metering piston chamber 40. The second valve and plunger unit 39 comprises an inner cylindrical member 41 and an outer sleeve 42. The first valve and plunger unit 34 and its piston chamber 35 have first, second, third, and fourth valve port means 43, 44, 45, and 46 respectively associated therewith. The first and second valve port means 43 and 44 are respectively connected to passages 47 and 48, which are, in turn, respectively connected to the system delivery ports 23 and 24 when the valve and plunger unit 34 is at a first limiting end position (to the left as viewed in FIGS. 2 and 3) and at a second limiting end position (to the right as viewed in FIGS. 2 and 3) respectively.

Fifth and sixth valve port means 49 and 50 are associated with the second valve and plunger unit 39 and its metering piston chamber 40. First and second passage means 51 and 52 respectively connect the first and second in-out line ports 21 and 22 with each end of the valving piston chamber 35; and third and fourth passage means 53 and 54 respectively connect the third and fourth valve port means 45 and 46 with each end of the metering piston chamber 40. Fifth passage means 55 connects the fifth and sixth valve port means 49 and 50 to the first and second in-out line ports 21 and 22.

There is provided a poppet valve 56 in the fifth passage means 55 between that passage means and the in-out line port 21 and a poppet valve means 57 in the fifth passage means 55 between that passage means and the in-out line port 22. As may be seen most clearly in FIG. 4, each poppet valve means 56 and 57 includes a valve seat 58 which comprises a hollow cylindrical sleeve 59 fixed to the block 20 and a closure member 60 which is biased by a spring 61 to a normally closed position on the seat 58. Thus, each poppet valve means 56 and 57 permits flow from the fifth passage means 55 to the first in-out line port 21 and to the second in-out line port 22, but prevents flow from these ports to the fifth passage means 55.

The feeder 10 is provided with a cycle indicating means which comprises a transparent housing 62 having a bore 63 therein. A spring 64 is mounted within the bore 63 and biases a magnet 65 inwardly toward the block 20. A magnet 66 is mounted on one end of the second valve and plunger unit 39 and is slidable therewith. The magnets 65 and 66 are positioned so that they have identical poles opposing each other and so that when the second valve and plunger unit 39 reaches its first limiting end position, the magnet 65 will be repelled by the magnet 66. The repulsion of the magnet 65 by the magnet 66 indicates a metering cycle and indicates the proper functioning of the feeder 10.

The feeder 10 is further provided with means to adjust the stroke of the second valve and plunger unit 39 and, therefore, the amount of metered lubricant. To this end, there is provided an adjusting screw assembly 67 which comprises a fitting 68 threaded into one side of the block 20. The fitting 68 has a threaded bore 69 which is in fluid communication with the metering piston chamber 40. An adjustable stop 70 having a threaded body portion 71 and a detent portion 72 is threaded into the bore 69 so that the detent portion 72 defines the second limiting end position for the second valve and plunger unit 39. Thus, the stroke of the valve and plunger unit 39 may be adjusted to thereby vary the stroke of the valve and plunger unit 39. In order to prevent accidental movement of the stop 70, a cap 73 is threaded onto one end of the fitting 68. Although the stroke of the member 41 may be varied, the sleeve 42 ensures proper porting of the metering chamber 40, since the stroke of the sleeve 42 is not affected by the detent portion 72.

OPERATION

Assuming that the lubricant flow through the single line 11 has been reversed after a previous lubricating cycle and that fluid is now being admitted through the first in-out line port 21, lubricant admitted through the port 21 flows through the first passageway 51 to one end of the valving piston chamber 35 and moves the valving piston 36 from the position illustrated in FIG. 2 to the position illustrated in FIG. 3. Lubricant is thereby admitted through the third port means 45 through the third passage means 53 to the metering piston chamber 40. When lubricant is admitted through the third conduit means 53 to the metering piston chamber 40, the second valve and plunger unit 39 is moved from the position illustrated in FIG. 2 to the position illustrated in FIG. 3. Movement of the valve and plunger unit 42 in this manner closes the sixth valve port means 50 and forces lubricant through the fourth passage means 54. The amount of lubricant which is forced through the fourth passage means 54 is established by the length of stroke of the second valve and plunger unit 39 and such stroke is, in turn, established by the position of the detent portion 72. Even though the member 41 may be stopped by the detent portion 72 prior to a full stroke, the sleeve 42 is permitted to continue its travel to open the fifth valve port means 49.

A metered amount of lubricant flows through the fourth passage means 54, the now open second valve port means 44, the conduit means 48, and to the system delivery port means 24. When the sleeve 42 opens the fifth valve port means 49 at the completion of a metering stroke, fluid is permitted to flow from the third passage means 53, through the chamber 40, the port means 49, and into the fifth passage means 55. Since lubricant pressure in the first in-out port 21 opposes any opening of the valve 56, the lubricant in the passage 55 opens the valve 57 and the lubricant flows out through the in-out line port 22 to the next feeder in the line 11.

When the flow through the in-out line port 22 ceases upon the completion of a full circuit through the line 11, the valve 57 is closed in response to the cessation of such flow by its spring 61. When flow is reversed in the line 11 and fluid is admitted to the in-out line port 22, the valve 57 is in a closed position and remains closed so that flow is conducted through the second passage means 52 and into the valving piston chamber 35 to thereby move the valve and plunger unit 34 from the position illustrated in FIG. 3 to the position illustrated in FIG. 2. Reversal of the valve and plunger unit 34 to that position opens the fourth valve port means 46 to permit lubricant to flow into the fourth passage means 54 and at the same time blocks the second valve port means 44 and opens the first valve port means 43. When lubricant is admitted to the fourth passage means 54, the second valve and plunger unit 39 is moved from the position illustrated in FIG. 3 to the position illustrated in FIG. 2, thereby metering a measured amount of lubricant through the third passage means 53, and at the completion of the metering opening the sixth valve port means 50. As the second valve and plunger unit 39 approaches and reaches its first limiting end position, the magnet 66 repels the magnet 65 to move the magnet 65 within the bore 63 against the bias of the spring 64, thus indicating a complete metering cycle through the feeder 10. The metered amount of lubricant passes through the third passageway 53, the first valve port means 43, the conduit 47, and to the system delivery port means 23.

At the completion of the stroke of the second valve and plunger unit 39, the sixth valve port means 50 is opened so that further lubricant flow continues from the fourth passage means 54 through the piston chamber 40, the sixth valve port means 50, and into the fifth conduit means 55. Since the valve 57 is held in a closed position by its spring 61 and by lubricant pressure in the second in-out line port 22, lubricant flow opens the valve 56 and enters the first in-out line port 21 and flows to the next feeder 10 in the line 11.

The invention is not restricted to the slavish imitation of each and every detail set forth above. Obviously, devices may be provided which change, eliminate, or add certain specific details without departing from the scope of the invention.

What is claimed is:

1. A single line reversing feeder for metering a measured amount of lubricant from a single line to system delivery line means comprising first and second in-out ports, valving piston means movable in a valving piston chamber between first and second limiting end positions, metering piston means including a valve and plunger unit slidable within a metering piston chamber between first and second limiting end positions, first and second passage means alternately connecting the first and second in-out line ports with first and second ends of the metering piston chamber when said first and second positions of the valving piston means respectively obtain, said metering piston means being moved only after one of the limiting positions of the valving piston obtains to deliver a metered amount of lubricant to said system delivery line means, said metering piston means only after movement connecting said first end of said metering piston chamber to a passage means communicating with said second in-out port to direct flow from said first in-out port to said second in-out port through said passage means communicating with said second in-out port, a one-way check valve in said passage means, said check valve being opened in response to flow to said second in-out port and being closed in response to the cessation of said flow.

2. A single line reversing feeder for metering a measured amount of lubricant from a single line to system delivery line means comprising a feeder block fixed to and in fluid communication with said single line and said system delivery line means, first and second in-out ports in said block, valving piston means movable in a valving piston chamber between first and second limiting end positions, metering piston means including a valve and plunger unit slidable within a metering piston chamber between first and second limiting end positions, first and second passage means alternately connecting the first and second in-out line ports with first and second ends of the metering piston chamber when said first and second positions of the valving piston means respectively obtain, said metering piston means being moved only after one of the limiting positions of the valving piston obtains to deliver a metered amount of lubricant to said system delivery line means, said metering piston means only after movement connecting said first end of said metering piston chamber to a passage means communicating with said second in-out port to direct flow from said first in-out port to said second in-out port through said passage means communicating with said second in-out port, a one-way check valve in said passage means, said check valve having a valve seat which is fixed relative to said feeder block, said check valve means being opened in response to flow to said second in-out port and being closed in response to the cessation of said flow.

3. A single line reversing feeder comprising a body having first and second in-out line ports, system delivery port means, a first valve and plunger unit slidable within a valving piston chamber between first and second limiting end positions, a second valve and plunger unit slidable within a metering piston chamber between first and second limiting end positions, first, second, third, and fourth valve port means associated with said first valve and plunger unit, said first and second valve port means being connected to said system delivery ports, fifth and sixth valve port means associated with said second valve and plunger units, first and second passage means respectively connecting the first and second in-out line ports with each end of the valving piston chamber, third and fourth passage means connecting the third and fourth valve port means with each end of the metering piston chamber, fifth passage means connecting the fifth and sixth valve port means to said first and second in-out line ports, poppet valve means in said fifth passage means between said fifth passage means and each in-out line port, said poppet valve means being biased in a closed position and permitting one-way flow to said in-out ports from said fifth passage means, said first valve and plunger unit attaining its second limiting end position to open said second and third valve port means and close said first and fourth valve port means when fluid is admitted through said first in-out port, said second valve and plunger unit attaining its second limiting end position to force a measured amount of fluid through said fourth passageway, through said second valve port means, and to said system delivery port means, said second valve and plunger unit opening said fifth valve port means when said second limiting end position obtains to permit further fluid flow through said fifth valve port means, said fifth passage means, said poppet valve means, and to said second in-out line port, whereby said in-out ports are in fluid communication when said limiting end positions obtain.

4. In a single line reversing feeder comprising a feeder block having a metering piston which is movable within a piston chamber to deliver a metered amount of lubricant at each end of its stroke, the improvement which includes a cycle indicator comprising a first magnet mounted on one end of said piston and slidable therewith toward one end of said chamber and a second magnet mounted on an outer portion of the block adjacent said one end of said chamber and being biased toward said chamber, said magnets having their like poles in face-to-face alignment so that the second magnet is repelled and moved outwardly relative to the feeder block as the piston approaches and reaches the end of its stroke to indicate the completion of a metering cycle.

References Cited

UNITED STATES PATENTS

| 2,269,928 | 11/1942 | Dirkes | 184—7 |
| 3,337,003 | 8/1967 | Acker | 184—7 |
| 3,393,841 | 7/1968 | Brehmer | 222—335 |

FOREIGN PATENTS

| 1,123,142 | 6/1956 | France. |
| 842,313 | 7/1960 | Great Britain. |

ROBERT A. O'LEARY, Primary Examiner

M. A. ANTONAKAS, Assistant Examiner

U.S. Cl. X.R.

222—335